United States Patent

Schubert

[15] 3,646,593
[45] Feb. 29, 1972

[54] APPARATUS FOR THE AUTOMATIC SHARPENING OF BROACHING OR REAMING TOOLS

[72] Inventor: Ludwig Schubert, Solingen-Ohligs, Germany

[73] Assignee: Oswald Forst GmbH, Solingen, Germany

[22] Filed: July 7, 1969

[21] Appl. No.: 839,308

[30] Foreign Application Priority Data

July 5, 1968 Germany......................P 17 52 718.3

[52] U.S. Cl..........................................51/165 R, 51/216 ND
[51] Int. Cl............................................................B24b 49/00
[58] Field of Search..........51/165 R, 165.71, 165.77, 92 ND, 51/288, 216 ND

[56] References Cited

UNITED STATES PATENTS

| | | | |
|---|---|---|---|
| 1,617,798 | 2/1927 | Edgar | 51/288 |
| 3,039,237 | 6/1962 | Peterson | 51/165 X |
| 3,323,260 | 6/1967 | Oxford | 51/288 |

*Primary Examiner*—Lester M. Swingle
*Attorney*—Robert H. Jacob

[57] ABSTRACT

In an apparatus for automatically sharpening reaming or broaching tools, the spacing and pitch of the tool edges are mechanically scanned and a grinding disk is guided by electrical signals corresponding to the scanning values, a horizontal slide is provided for carrying the work blank, a vertical slide is movable about a horizontal axis, a grinding slide with grinding spindles and grinding disks is mounted on the vertical slide for movement transversely of the horizontal slide with drive means for slide and spindle, the scanning means and grinding disk are provided at the grinding spindle and an electronic guiding means is provided for guiding the drive means.

7 Claims, 5 Drawing Figures

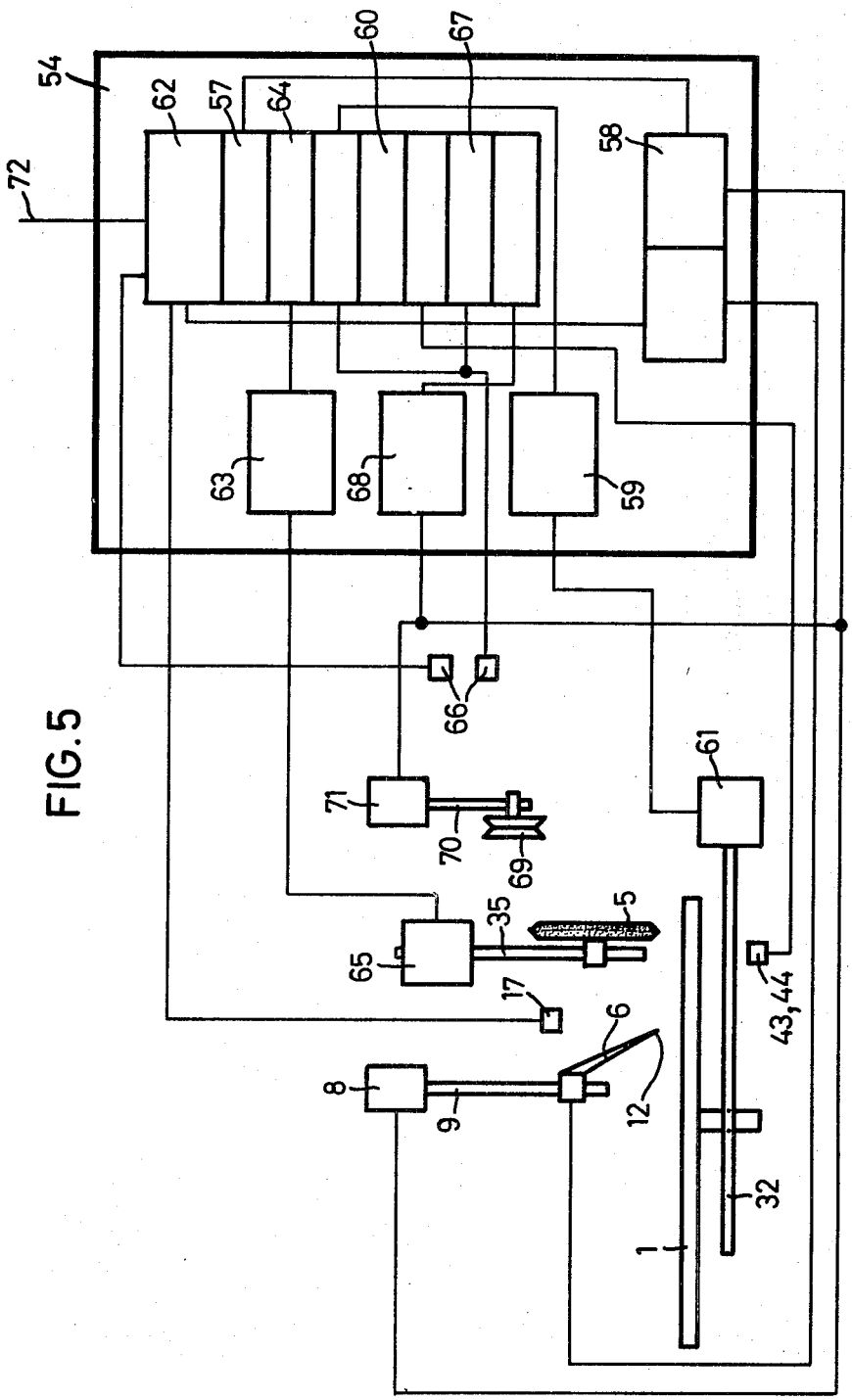

APPARATUS FOR THE AUTOMATIC SHARPENING OF BROACHING OR REAMING TOOLS

BACKGROUND OF THE INVENTION

The invention concerns the automatic sharpening of broaching or reaming tools.

The invention is based on the problem of providing an apparatus for sharpening broaching or reaming tools wherein the sharpening is effected to a great extent independently of a grinder with continuously equal quality, particularly in the matter of maintaining the geometry of the cutting edges.

SUMMARY OF THE INVENTION

The problem on which the invention is based is essentially met in that the spacing and the pitch of the edges of the broaching or reaming tools are mechanically scanned and the grinding disk is guided by electrical signals in accordance with the scanning values. This method provides the advantage that broaching tools, which in actual practice frequently have different spacings and pitch, can be ground entirely automatically. Furthermore, it is possible in accordance with the invention to maintain the geometry of the edges of the broaching or reaming tool accurately because abrasions that remain exactly the same are effected on all teeth of the broaching tool.

It is of particular advantage if the scanning device and the grinding disk are guided substantially parallel during the scanning and the subsequent grinding operation.

In a broaching tool sharpening machine comprising a machine bed or base, a horizontal slide for receiving the work blank, a vertical slide pivotally movable about a horizontal axis and a grinding slide with grinding spindles mounted thereon, which is movable transversely with respect to the horizontal slide, and driving devices for slide and spindle, it is furthermore particularly advantageous if the scanning device together with the grinding disk and the grinding spindle are arranged together, and if for controlling the driving means an electronic control device is provided.

It is advantageous if the scanning means is provided with a resilient scanning finger which acts on a limit switch that releases the control or guiding signals, and if the scanning finger has a scanning surface and a noselike projection, and if for adjusting the scanning finger relative to the limit switch a setting screw is provided on the former.

Advantageously the scanning means is arranged upon a baseplate movable by means of a stepping motor serving as feeding means, and setting or adjusting screws acting horizontally and vertically for adjusting the scanning means with respect to the grinding disk are provided, by means of which the scanning means is adjustable relative to the baseplate.

Furthermore, the scanning means is advantageously mounted upon the baseplate in an angularly adjustable manner.

Stepping motors are suitably provided as drive means.

BRIEF DESCRIPTION OF THE DRAWINGS

Further advantages and features of the invention will become apparent from the following description of an embodiment with reference to the drawings, in which FIG. 5 is a schematic block diagram which illustrates the principle of the guiding operation.

DESCRIPTION OF THE INVENTION

Figure 1:
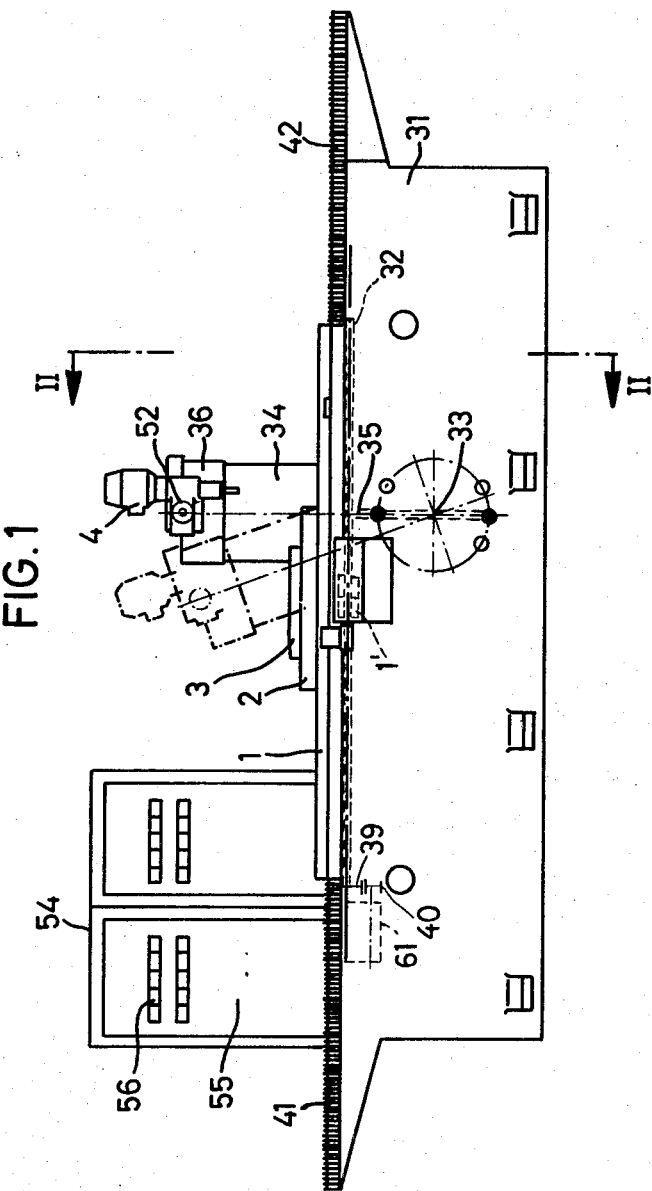
FIG. 1 is a schematic side view of the apparatus in accordance with the invention for automatically sharpening broaching or reaming tools.

An embodiment of a broaching tool sharpening machine in accordance with the invention comprises basically, as shown in FIG. 1, a horizontal slide 1 arranged upon a machine base 31 and driven by a stepping motor 61 connected by gears 39, 40 to a threaded rotating spindle 32 mounting a traversing nut 1' secured to slide 1 which carries the tool 3 to be sharpened upon a magnetic clamping plate 2, and a vertical slide 34 connected with the base of the machine that is pivotally movable about a horizontal transverse axis 33 which is likewise driven by a stepping motor 65 (FIGS. 2 and 5) connected by a worm and gear drive 35' (FIG. 2) to a threaded rotating spindle 35 mounting a traversing nut 34' (FIG. 2) secured to slide 34. At its upper end the slide 34 carries a rotatably supported grinding slide 36 having one or several grinding spindle assemblies 4.

Figure 2:
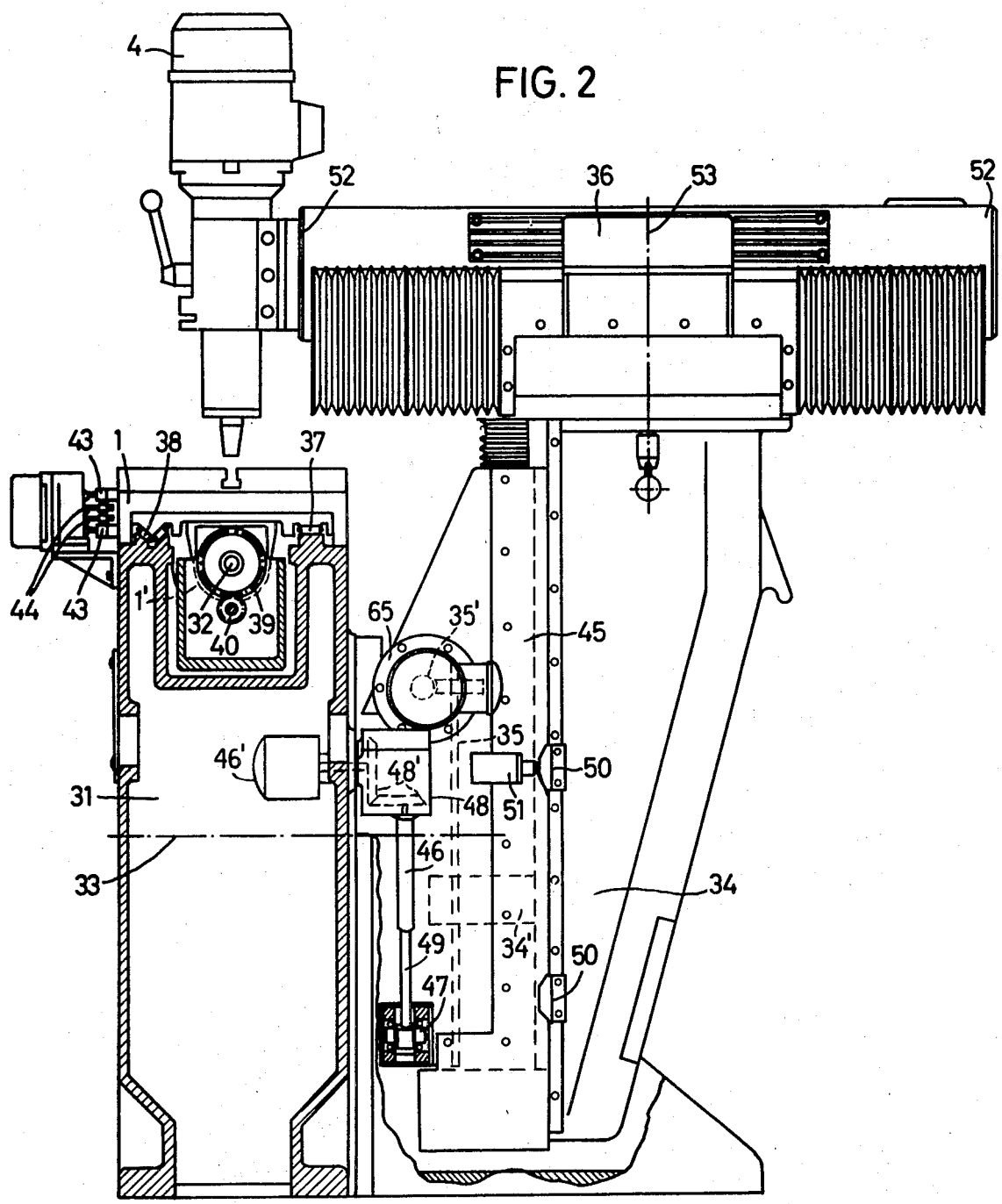
FIG. 2 is a section taken along line II—II in FIG. 1.

The horizontal slide 1 is guided for easy movement upon the machine base 31, for example, by means of cylindrical roller guides 37, 38. As shown in FIG. 2, the drive of the rotating spindle 32 of the horizontal slide 1 is effected by the toothed gear 39 keyed to the rotating spindle 32 and the pinion 40 which is connected with the stepping motor 61. In order to avoid soiling of the cylindrical roller guides 37 and 38, folding bag covers 41, 42 are mounted laterally of the horizontal slide 1.

Laterally of the horizontal slide 1 end switches 43, 44 are provided. The end switches 43 limit the path of the horizontal slide in accordance with the length of the machine base 31, while end switches 44 are adjustable relative to the length of the broaching tools 3.

The vertical slide 34 is disposed on a guide structure 45 in which it can be displaced by the stepping motor 65 (FIG. 2) by way of the rotating spindle 35. The guide structure 45 can be swung about the horizontal axis 33. For this purpose a rocking device 46 is provided. The rocking device 46 is mounted at its one end 47 on the guide means 45 and at its other end 48 at the machine base 31. By changing the length of the spindle 49 relative to the upper end 48 of the rocking device 46 the guide means 45, and with it the vertical slide 34, is rocked about the axis 33. The drive of the rocking means is effected by a drive motor 46' (FIG. 2) that is disposed in or on the machine base 31, and by way of bevel gears 48' arranged in a housing defined at the upper end 48.

Abutments 50 for a lifting stroke limiting switch 51 for limiting the machine stroke of the vertical slide 34 are provided on the vertical slide 34.

The grinding slide 36 is reciprocally movable by hydraulic means with respect to the horizontal slide 1 upon the vertical slide 34. It has at each end a cylindrical receptacle 52 for one grinding spindle assembly 4 that can be inclined by a worm gear, not shown. In the example illustrated only one grinding spindle assembly 4 is provided on the grinding slide 36. By turning the grinding slide 36 by 180° about the axis 53 it is possible to use one or the other grinding spindle assembly 4. The grinding spindle assemblies 4 are in the form of motor grinding spindles with common journaling for the spindle and the motor. At the grinding spindle assemblies 4 grinding disks 5 are provided as actual grinding elements.

Figure 3:
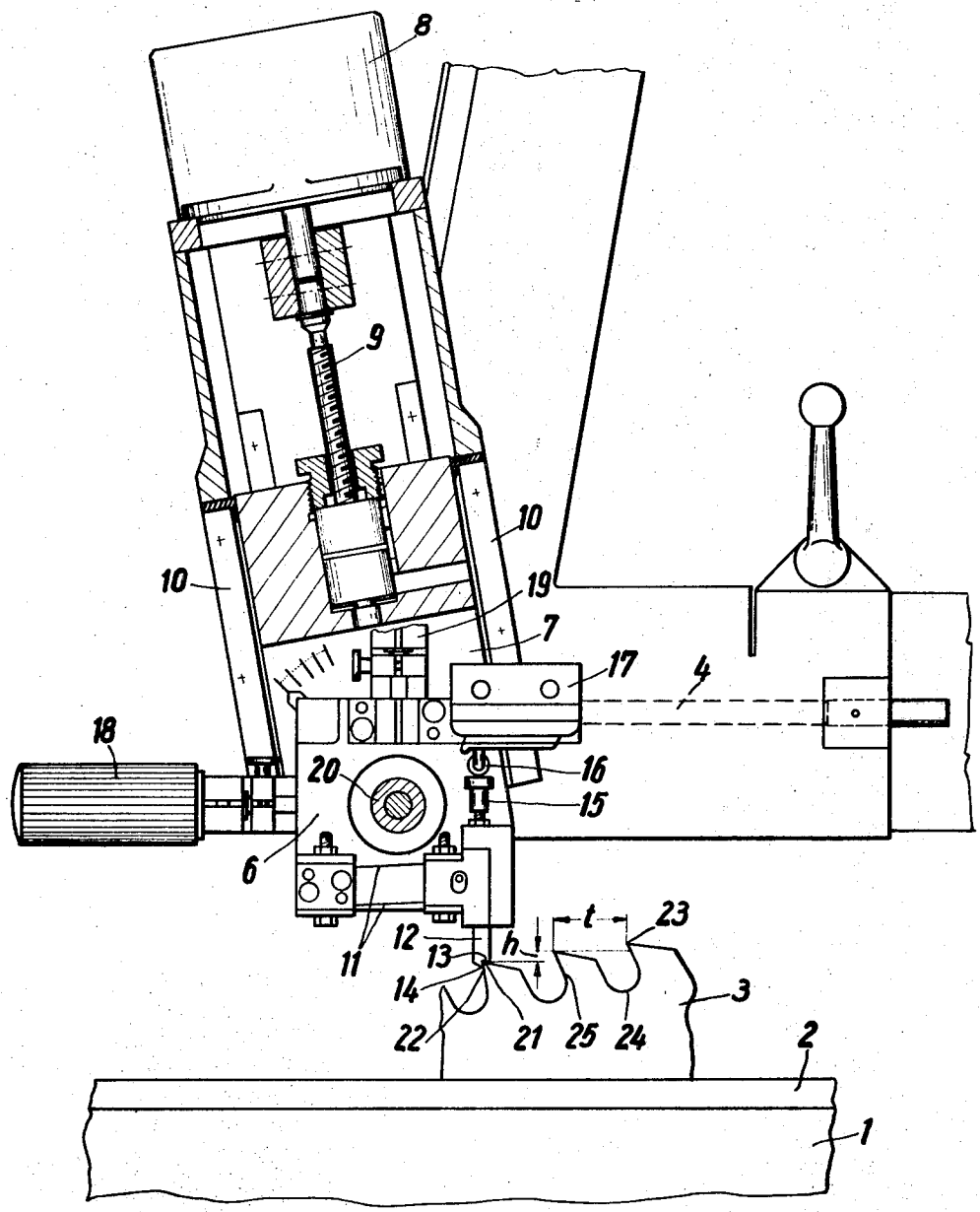
FIG. 3 is a front view of the scanning device while scanning a tool to be sharpened.
Figure 4:
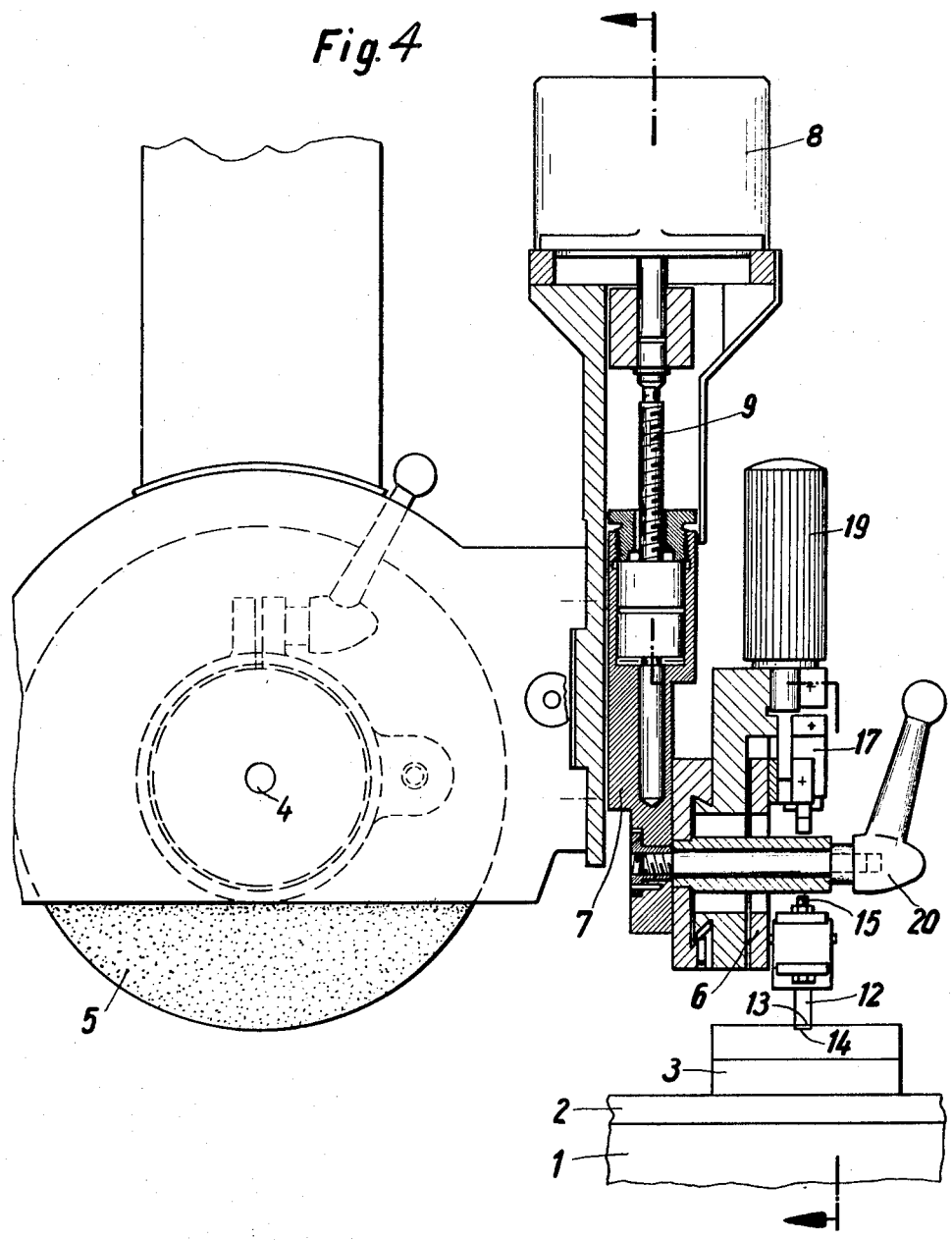
FIG. 4 is a side view of the scanning device with a grinding disk.

At the forward part of the grinding spindle assembly 4 a scanning device 6 (FIG. 3) is provided upon a baseplate 7 serving as a feeding device. This baseplate 7 and with it the scanning means 6 is movable with respect to the grinding spindle assembly 4 by means of a stepping motor 8 by way of a rotating spindle 9 in raillike guide members 10. The actual scanning element is a scanning finger 12 resiliently mounted, for example, with two leaf springs 11 on the scanning means, and which at its lower end has a flat touching or scanning surface 13 and a noselike projection 14. At the end opposite the scanning surface 13 scanning finger 12 engages by way of a setting screw 15 the actuating roller 16 of a limiting switch 17 which is mounted on the scanning means 6. The limiting switch 17 responds after a relatively short forward movement within a very short switching time, and beyond that it has a relatively large following path. The scanning device 6 may be adjusted by means of the setting screws 18, 19, 20 upon the baseplate 7, horizontally 18 and vertically 19, and pivotally moved 20, and thereby adjusted with respect to the grinding disk 5. Such an adjustment is necessary, for example, after each change of the grinding disk 5.

The control of the drive motors is effected by means of an electronic control arrangement 55 disposed in a cabinet 54, where the magnitude of the settings in the different directions can be adjusted manually by means of preselecting counters 56.

The course of the automatic method for sharp grinding, for example, of the sharp surfaces 21 of a flat reaming device 3, is described hereinafter.

First the scanning device 6 is set by an amount preselected in the control unit 57 by way of control unit 58 against the work blank 3 mounted upon the horizontal slide 1 by means of setting motor 8. Then, released by a control signal of the electronic control units 59, 60, the horizontal slide 1 is moved in one direction by the stepping motor 61 until the nose-shaped projection 14 of the scanning finger 12 drops downwardly by way of an edge 22 of the broaching tool 3 and the scanning surface 13 of the scanning finger 12 rests upon the free surface 23 of the broaching tool 3. Due to the downward movement of the scanning finger 12 the horizontal slide 1 is stopped by way of the limiting switch 17 and the electronic control unit 60. Thus, the spacing $t$ of the broaching tool 3 is scanned and the setting of the broaching tool to be ground is already determined in a horizontal coordinate.

Subsequently, released by a control signal, the electronic control units 63, 64 drive the vertical slide downwardly by means of the stepping motor 65 until a signal is released by way of the scanning finger 12 and the limiting switch 17, by means of which the movement of the vertical slide is stopped through the control unit 62. Thus the pitch $h$ of the broaching tool 3 is scanned. Such a sequence of method steps provides the advantage that the two most important geometric quantities of a broaching or reaming tool, i.e., the pitch $h$ and the spacing $t$, are taken into account during grinding, so that the cutting geometry is maintained.

Then, by means of the setting motor 8, the scanning means 6 is raised by a predetermined amount that corresponds to the setting prior to the start of the scanning, i.e., for example, 1 mm., by way of a control signal of the electronic control units 57, 58.

If the work blank 3 has not as yet been ground in accordance with this method, then the vertical slide 34 is adjusted by an amount predetermined in the control unit 64, for example 0.02 mm. per thrust up to a total of 0.2 mm., in order to obtain an even depth of the chip chambers 24. Since the chip surface 21 is ground down to the chip chamber base 24, thus including the chip running surface 25, any cutter geometry that may no longer exist is restored.

Subsequently the horizontal slide 1 is automatically adjusted by a predetermined amount that corresponds to the thickness of the layer to be ground off from the chip surface 21 of the tool 3, for example 0.02 mm. per thrust up to a total of 0.1 mm., in which connection the counting of the thrusts is undertaken by an end switch 66 that is connected with the control unit 60.

The scanning means 6 is then moved laterally from the work blank 3, so that the grinding wheel 5 which is mounted upon it together with the scanning means on the grinding spindle assembly 4 comes into engagement with the surface 21, 25 to be ground and is moved past it, while the actual grinding operation is carried out which takes place, for example, five times in connection with the aforementioned values. Subsequently the vertical slide is raised by a predetermined amount, and the grinding disk 5 and the scanning means 6 are moved back transversely with respect to the work blank.

This scanning and grinding operation is repeated on all teeth of the broaching tool 3 to be ground.

After a predetermined number of grinding operations the grinding disk 5 is oriented by means of an adjusting device controlled by one of the electronic control units 67, 68, which comprises the adjusting roller 69, the rotating spindle 70 and the stepping motor 71, by an amount predetermined in the control unit 67, and subsequently correction of the scanning means 6 is effected by the setting motor 8 in an amount corresponding to the adjustment. The control units are connected at 72 with a source of potential.

The grinding of the free surface 23 of flat reaming tools 3 takes place in accordance with the same principle, only that instead of flat grinding disks 5 pot disks are used. At the other support 52 of the grinding slide 36 there will normally be a grinding spindle assembly with a pot disk. The chip surfaces of round broaching tools may be ground in the same manner. Here there is only the difference that the chip surfaces are ground with the outer circumference of flat round grinding disks and that these grinding disks are placed at an angle.

Having now described my invention with reference to the illustrated embodiment what I desire to protect by Letters Patent of the United States is set forth in the appended claims.

I claim:

1. A sharpening machine for cutting tools particularly broaches comprising a machine base, a horizontal slide for supporting work blanks mounted on said base for endwise reciprocating movement, a vertical slide mounted on said base for endwise reciprocating movement and pivotal movement about a horizontal axis extending transversely of said horizontal slide, a grinding slide adjustably mounted on said vertical slide for movement transversely of said horizontal slide, a grinding spindle assembly including a power-driven grinding disk operatively mounted on said grinding slide for movement therewith relative to said horizontal slide; tool-scanning means adjustably mounted on said grinding spindle assembly, and power-transmitting means operatively interposed between said scanning means and said horizontal and vertical slides for adjusting said horizontal and vertical slides in response to adjustment of said scanning means.

2. A sharpening machine as set forth in claim 1 wherein said scanning means includes a movable scanning finger resiliently mounted on said grinding spindle assembly, and wherein a limit switch of an electrical control circuit is mounted on said grinding spindle assembly for cooperative engagement by said scanning finger.

3. A sharpening machine as set forth in claim 2 wherein said scanning finger has a planar scanning surface and a nose-shaped projection extending from said scanning surface.

4. A sharpening machine as set forth in claim 2 and further comprising a setting screw operatively interconnecting said scanning finger and said limit switch.

5. A sharpening machine as set forth in claim 4 and further comprising a support on said grinding spindle assembly mounting said scanning means for back-and-forth adjustment relative to said grinding slide, and a stepping motor operative to effect said back-and-forth adjustment of said scanning means.

6. A sharpening machine as set forth in claim 5 and further comprising horizontally and vertically movable adjusting screws operatively interposed between said support and said scanning means.

7. A sharpening machine as set forth in claim 6 and further including a pivotal connection between said support and scanning means on an axis extending transversely of said adjusting screws.

* * * * *